Nov. 10, 1970  R. J. PIATEK ET AL  3,538,606
FOOD HANDLING APPARATUS
Filed Feb. 8, 1968  5 Sheets-Sheet 1

INVENTORS
ROBERT J. PIATEK
DICK A. MILLER

BY Anderson, Luedeka, Fitch, Even, & Tabin ATTORNEYS

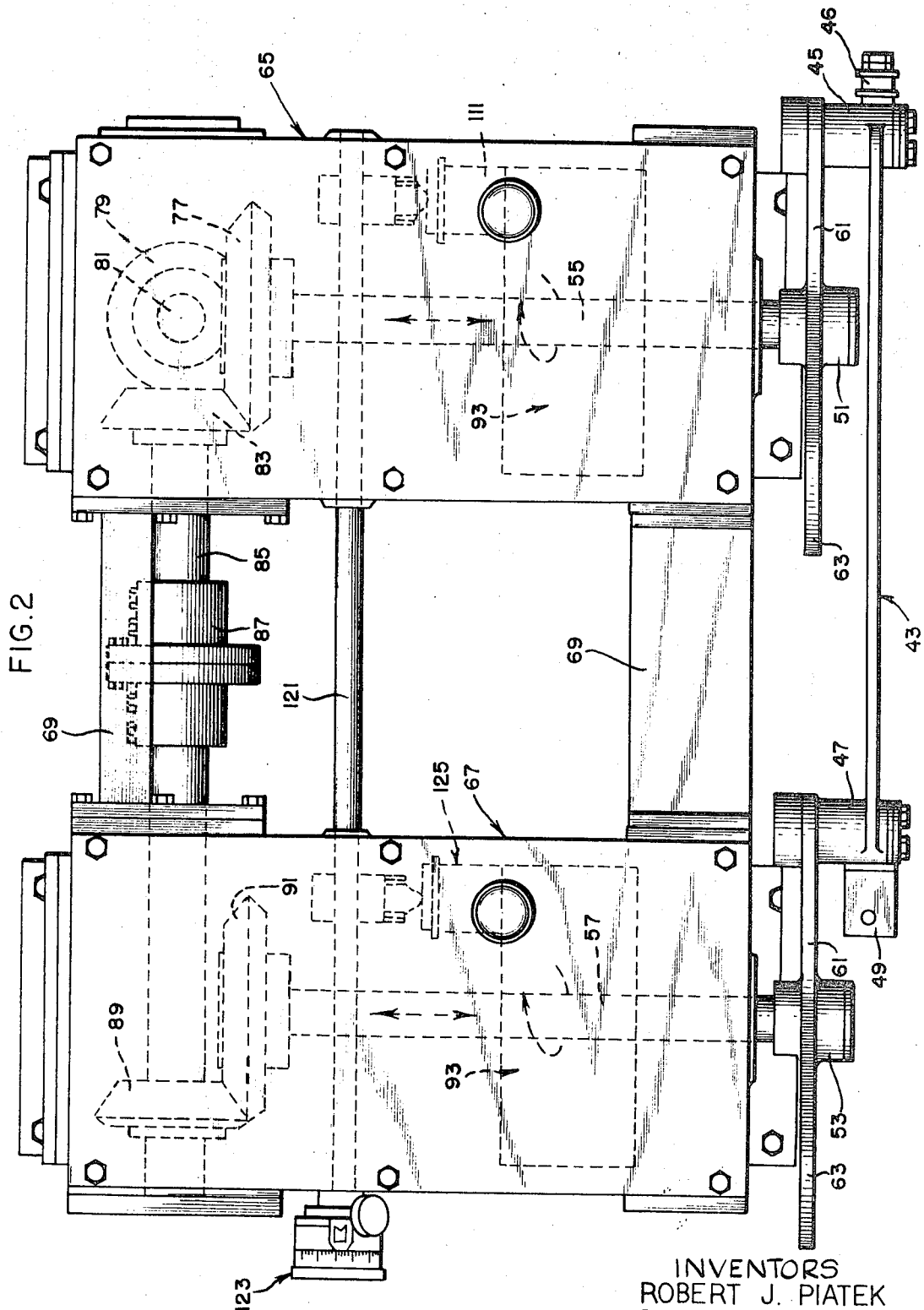

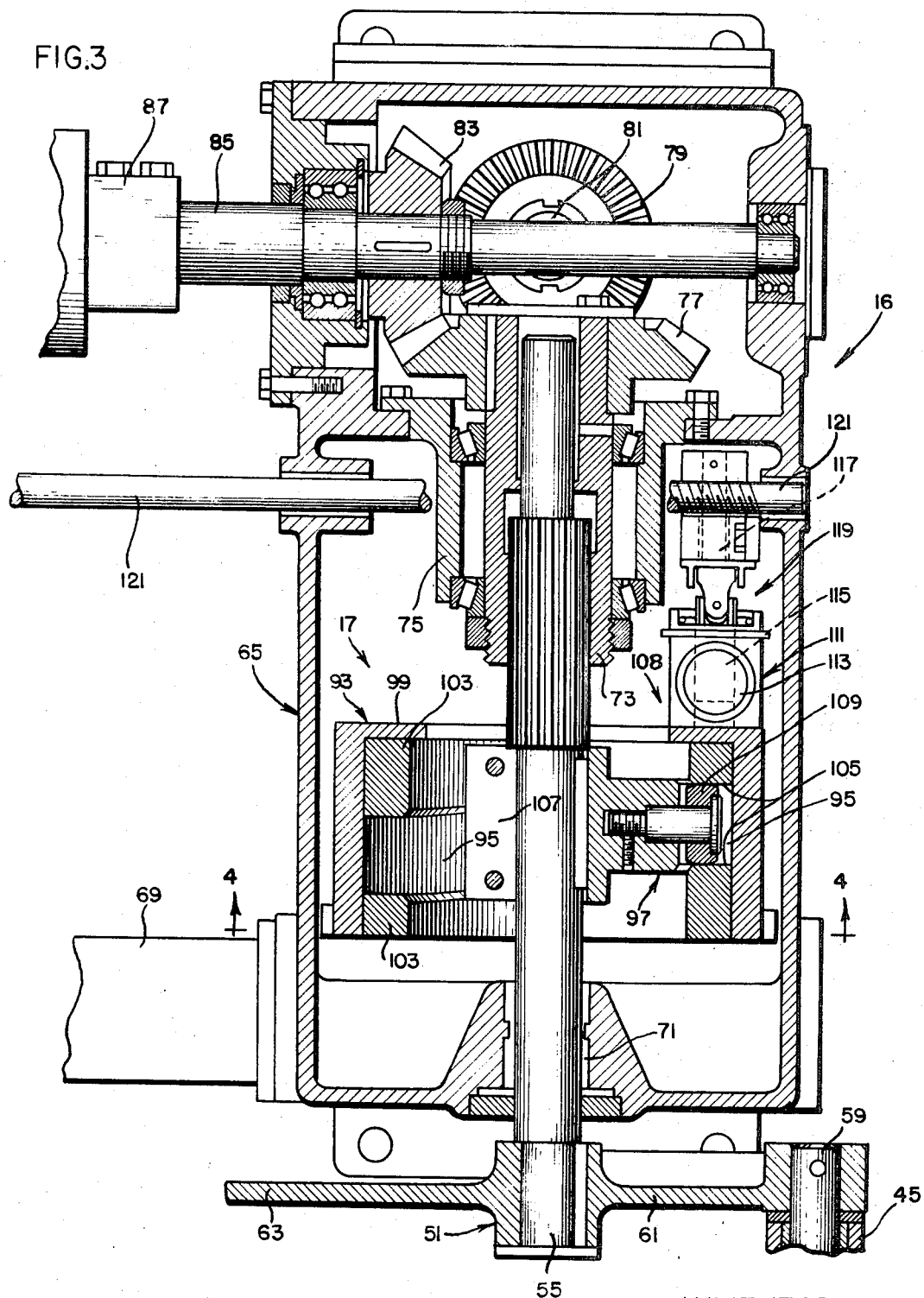

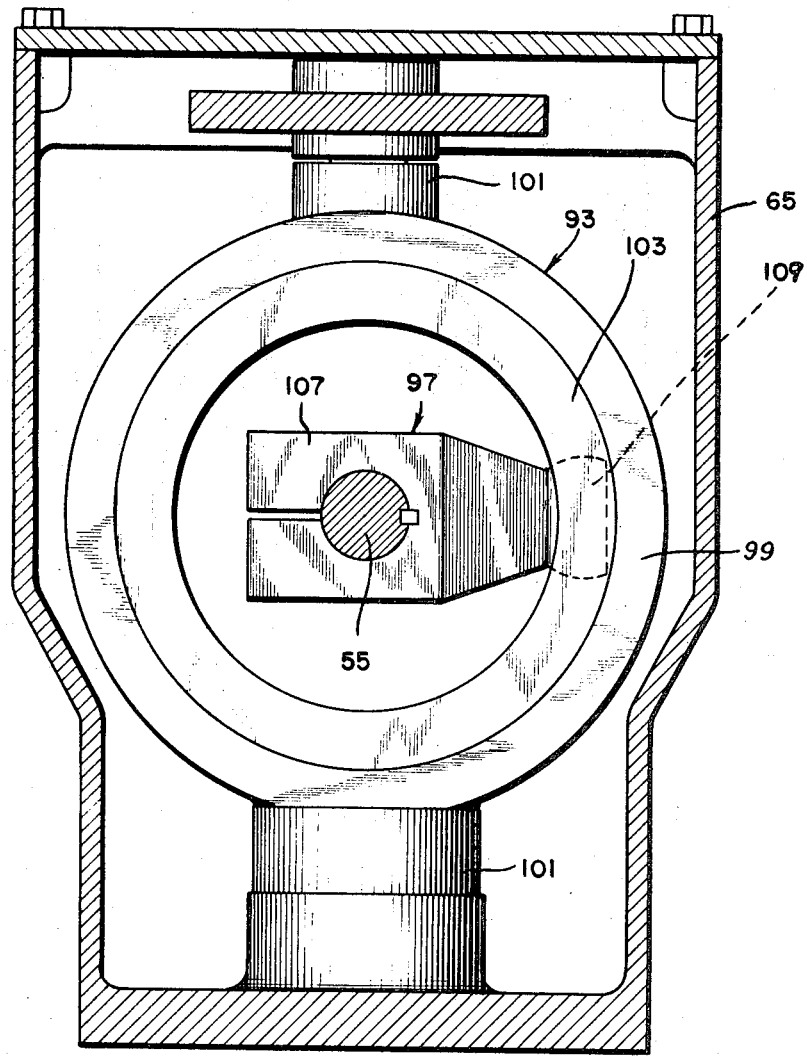

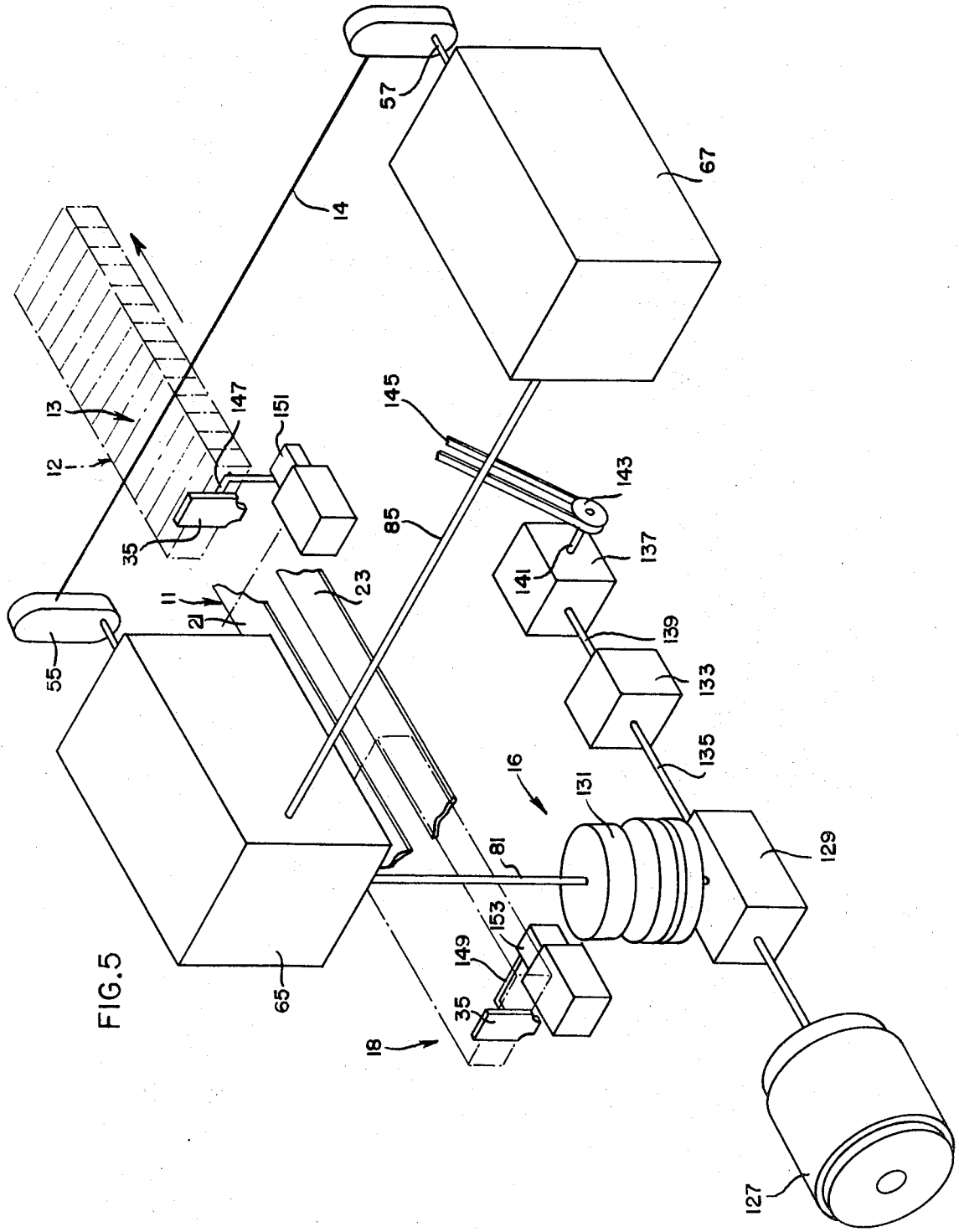

United States Patent Office

3,538,606
Patented Nov. 10, 1970

3,538,606
FOOD HANDLING APPARATUS
Robert J. Piatek, Chicago, and Dick A. Miller, Glenview, Ill., assignors to Kraftco Corporation, Chicago, Ill., a corporation of Delaware
Filed Feb. 8, 1968, Ser. No. 704,118
Int. Cl. A01j 23/00
U.S. Cl. 31—22     10 Claims

ABSTRACT OF THE DISCLOSURE

An apparatus is disclosed for cutting a segment from a slab of material such as cheese. The apparatus comprises an elongated cutting instrument, supported adjacent one of its ends, and means for moving the cutting instrument from a position above the slab downwardly and in the direction of its length so as to slice the slab while maintaining the longitudinal axis of the cutting instrument generally horizontal and simultaneously moving the cutting instrument horizontally in the direction of movement of the slab as it is being sliced.

---

This invention relates to cutting apparatus and, more particularly, to apparatus for cutting material into segments.

In many manufacturing operations, it is necessary to cut relatively long pieces of material into shorter segments. For example, a large block of cheese is frequently divided into long slabs which are then cut into consumer size segments for packaging and marketing. For large scale production operations, it is desirable to accomplish the cutting of these slabs as they move without interruption through a cutting station instead of hauling the movement of the slab as each cut is made. However, if slabs are fed by a conveyor one after another past a continuously moving cutting tool, both the first and the last segment cut from any one slab will generally be of improper size and unacceptable whereas, if the movement of the slab had been synchronized with the movement of the cutting tool, it is possible that only one segment would have had to be scraped.

Also, in the cutting of certain types of material, accuracy in the size of the segment being cut is extremely important. For example, in the case of food such as cheese, it is desirable that each package be provided with an accurate indication of the weight of its contents so that the consumer may be fairly apprised of the quantity being purchased. This may be, and frequently is, accomplished by weighing and marking each package individually before distribution to the consumer. However, it is believed preferable from a marketing standpoint to package commodities such as cheese in preprinted packages or in packages having labels which are preprinted. In order for preprinted packages and labels to be practical, however, it is necessary that a desired weight be selected and that units then be produced in such a manner that their weight is at least equal to that printed on the package. When the material being cut is of uniform density, and the slabs are of uniform thickness, the weight of each segment cut can be accurately controlled by controlling the distance between cuts, i.e., by controlling the length of the segments being cut.

It is also desirable from a packaging standpoint that at least certain dimensions of the units to be packaged be uniform so that it is not necessary for the packaging machinery to accommodate itself to units of various sizes. Uniform size is also desirable when preprinted wrapping material with advertising indicia repeated at preset intervals is used. When the material being cut is a slab of uniform thickness and width, the size of the segment to be packaged can also be controlled by controlling the distance between cuts.

It is also desirable in cutting apparatus to provide for controlled variation in the size (i.e., length) of the segments being cut. Such variation may, of course, be accomplished in intermittently operable conveyor apparatus by providing for adjustment of the distance of conveyor travel between cuts. Where the conveyor moves continuously while the cutting takes place, however, the speed of the conveyor relative to the period of the cutter cycle must ordinarily be appropriately adjusted. If a perpendicular cut is desired, the cutting tool must move through the material while moving in the direction in which the material is moving at the same speed as the material. Thus, if material speed is to be varied to vary the size of the cut, the corresponding component of movement of the cutting tool should also be varied.

Finally, apparatus for cutting slabs or the like should be capable of high speed operation and should be capable of imparting a smooth cut to the material at such high speeds.

It is an object of this invention to provide an improved apparatus for cutting material into segments.

Another object of the invention is to provide improved apparatus for cutting successive lengths of material into segments of predetermined size in such a manner that the maximum number of whole segments is obtained.

A further object of the invention is to provide an improved cutting apparatus wherein the distance between successive cuts in a length of material can be selectively varied.

Other objects of the invention will become apparaent to those skilled in the art from the following description, taken in connection with the accompanying drawings wherein:

FIG. 2 is a top view of the apparatus of FIG. 1;

FIG. 3 is a fragmentary sectional plan view taken along the line 3—3 of FIG. 1;

FIG. 4 is a sectional elevational view taken along the line 4—4 of FIG. 3; and

FIG. 5 is a schematic perspective view of the drive and control systems of an apparatus embodying various of the features of the present invention.

Figure 1:
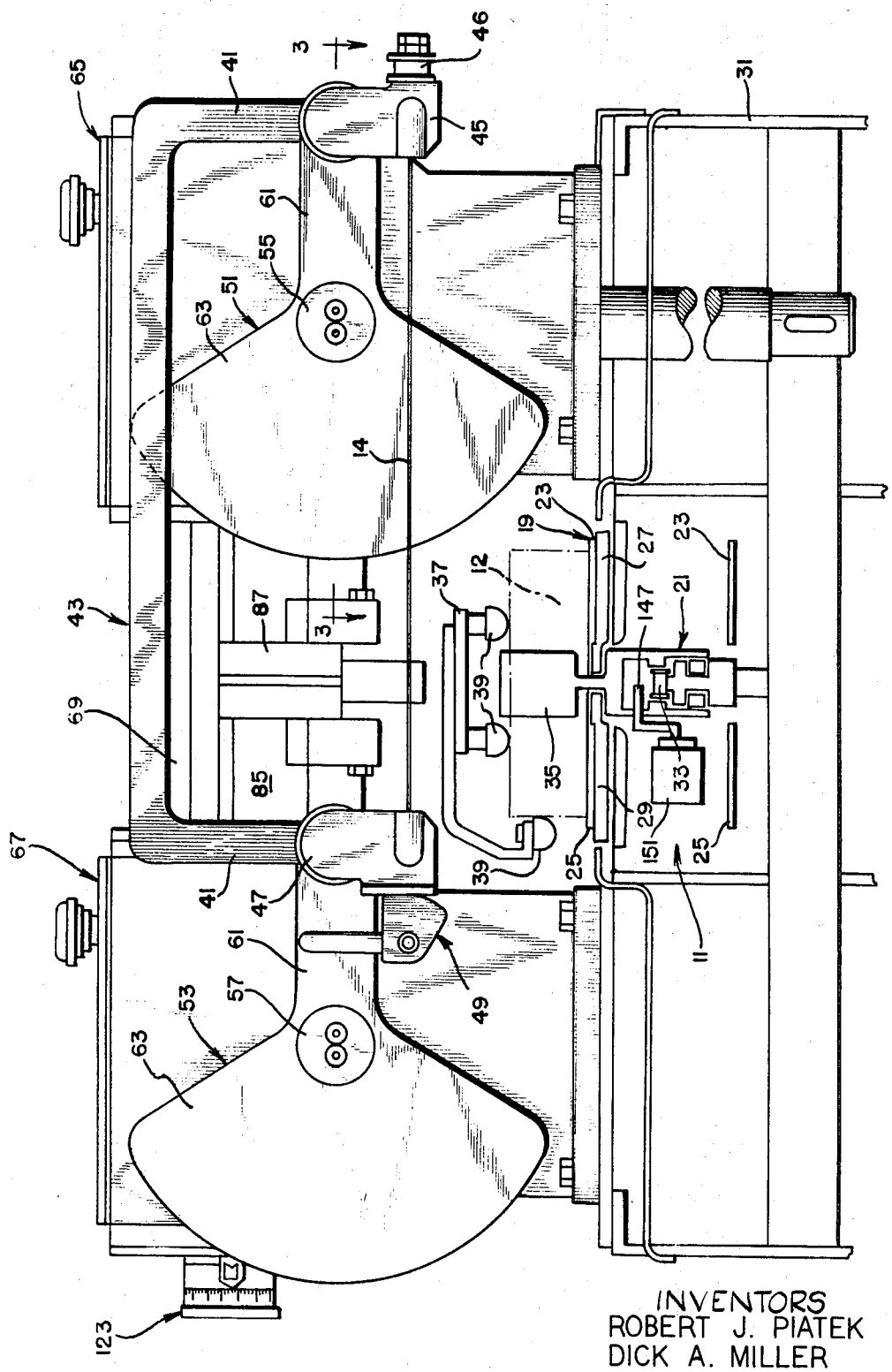
FIG. 1 is a fragmentary front elevational view of an apparatus showing various of the features of the invention, as viewed in the direction of the leading end of an approaching slab to be cut.

Very generally, the apparatus of the invention comprises a continuously moving conveyor 11 for advancing slabs or lengths 12 of the material to be cut to and through a cutting station 13 at a uniform speed. The slabs are not in abutting relation but are spaced from one another along the conveyor so as to approach the cutting station at spaced intervals. A cutting tool in the form of a wire 14 is moved into and out of the material at the cutting station in cycles of uniform period by actuating means 16, thereby providing cuts in the slab in uniformly spaced relation to one another to divide the slab into segments of predetermined size. The operation of the actuating means 16 can be adjusted to permit selective variation in the spacing between cuts and, hence, in the size of the segments provided, and means 17 are provided for varying the speed of the wire 14 during portions of the cycle to insure a vertical cut through the slab. Means 18 are provided for sensing the arrival of the trailing edge of a slab 12 at a preselected location and for initiating operation of the actuating means 16 so that the first segment cut will be such a size that the remainder of the slab will divide equally into segments of predetermined length.

More specifically, the conveyor 11 comprises a belt conveyor 19 and a chain conveyor 21. The belt conveyor 19 includes a pair of horizontally spaced continuous belts 23 and 25, the upper run of each of which is supported by a pair of plates 27 and 29 respectively. The tables, in turn, are supported on a frame 31. Beneath the spaced upper runs of the belts 23 and 25 is the chain conveyor 21 which includes a continuous chain 33 provided with lugs 35 at spaced intervals along its length. The lugs 35, one of which is shown in FIG. 1, extend upwardly in the gap between the belts 23 and 25 and serve to engage the rearward end of the slab 12 as the slab is advanced through the cutting station 13. To insure such engagement, the belts 23 and 25 are preferably driven so as to travel at a slightly slower speed than the chain 33. A bracket 37 is supported above the conveyor 11 by suitable means, not shown, and carries a plurality of ball-type pressure rails 39 which engage the top and one side of the slab 12 to maintain the slab in a desired path while it is being cut. In this regard, the upper rails prevent the slab from being lifted off the belts as the wire 14 is withdrawn from the slab after the cut has been made.

The cutting wire 14 extends between and is supported by the outer ends of a pair of arms 41 of a U-shaped cutter frame 43 which lies in and defines a vertical plane. In this respect, one of the arms 41 (the right hand arm in FIG. 1) is enlarged adjacent its outer end to provide a boss 45 which is suitably machined to receive a holder 46 attached to one end of the wire 14. The other arm 41 is also enlarged adjacent its outer end to provide a boss 47 suitably cut away and machined to receive a wire tensioning assembly 49.

As previously noted, the actuating means 16 move the cutting wire 14 into and out of the slab 12 to divide the slab into segments. Very generally, this is accomplished by pivotally mounting each of the arms 41 of the cutter frame 43 adjacent the outer end of one of a pair of cranks 51 and 53 driven by rotatably mounted shafts 55 and 57. As the shafts rotate, the cranks move the wire in a path in which it travels vertically downwardly into the slab as well as transversely across the slab to provide a slicing action, and then moves it upwardly out of the slab and transversely across and above the slab. During the entire cycle of movement of the wire, however, it is maintained in horizontal disposition by the cranks.

The shafts 55 and 57, in addition to rotating, also reciprocate along their longitudinal axes so as to move the cutting wire 14 in the direction of movement of the slab as the wire enters and leaves the slab. Ideally, this movement of the wire is at the same speed as the speed of travel of the slab so that the cut will be essentially vertical. Adjustment of the longitudinal component of the speed of the wire while it is in the slab is accomplished by the means 17, previously referred to.

More specifically, each of the bosses 45 and 47 is provided with a transverse bore extending normally to the plane of the cutter frame 43, and journalled within each bore is a dowel pin 59 by means of which that arm is pivotally attached to one of the cranks 51 or 53. Thus, relative rotational movement is provided for between the frame and cranks as the cranks rotate. Each of the cranks is in the form of a plate having an opening which receives one of the shafts 55 or 57. Extending in one direction from the shaft opening is an arm 61, which carries the dowel pin 59. Extending in the opposite direction is a fan-shaped counterweight 63.

The actuating means 16 is supported within housings 65 and 67 respectively which are mounted on opposite sides of the conveyor 11 and interconnected by cross beams 69. One of the shafts 55 and 57 are supported in generally horizontal disposition within each of the housings. Referring to FIG. 3, which shows a sectional plan view of the housing 65, the forward portion of the shaft 55 is journalled within a bearing 71 adjacent the forward end of the housing and projects through the forward wall of the housing to receive the crank 51. The rearward portion of the shaft is splined and is supported within an internally splined hollow shaft or sleeve 73 which is in turn mounted for rotation within a bearing support 75 fixed to the walls of the housing. Thus, the sleeve 73 rotates within the housing in a fixed position; the shaft 55 rotates with the sleeve 73 and is also shiftable along its axis relative to the sleeve by virtue of the splined interconnection between the two.

Mounted on the rearward end of the sleeve 73 is a bevel gear 77 which is in meshing engagement with a bevel gear 79 mounted on a vertical shaft 81 coupled to a power system referred to in greater detail shortly. The gear 77 is also in meshing engagement with a third bevel gear 83 carried on one end of a shaft 85 which extends from the interior of the housing 65 to the interior of the housing 67 and transmits power to the shaft 57.

The details of the construction within the housing 67 are similar to those described with reference to the housing 65. The shaft 85, which includes a coupling 87, is suitably journalled adjacent opposite ends in bearings supported by the housings. A bevel gear 89 is mounted on the shaft 85 within the housing 67 (FIG. 2) and is in meshing engagement with a bevel gear 91 secured to a rotatably mounted internally splined sleeve (not shown) similar to the sleeve 73. The sleeve of the housing 67 slidably receives and is drivingly connected to the splined portion of the shaft 57 which rotates the crank 53.

As the cheese is moved along on the conveyor 11 through the cutting station 13, rotation of the shafts 55 and 57 and the cranks 51 and 53 causes the wire 14 to be moved downwardly through and across the cheese to slice the cheese into segments. It will be appreciated, however, that if the cheese slab advances while the cut is being made by a wire moving in a vertical plane, the cut will not be vertical but slanted downwardly and rearwardly from the upper surface of the slab. In order to provide for a perpendicular cut while the conveyor is in motion, it is necessary to provide a horizontal component of motion to the cutting wire 14 as the cut is made having a speed in a forward direction equal to the forward speed of the slab. Moreover, a similar horizontal forward component of motion is also desirable as the wire is withdrawn so that it is withdrawn along the path of the initial cut. In this way, only one path is made in the cheese by the wire.

To provide the horizontal component of motion to the cutting wire 14, the means 17 is provided within each of the housings 65 and 67 respectively to effect reciprocating movement of the shafts. Each of the means 17, hereinafter described with reference to the shaft 55 located within the housing 65, includes a normally stationary but adjustably positionable cam 93 defining a cam track or channel 95 in which a cam follower 97 fixed to the shaft 55 travels. As the shaft 55 rotates, the cam track 95 causes the cam follower 97 to orbit around the shaft axis in a non-planar path in which it moves both forwardly and rearwardly relative to the housing 65, carrying the shaft 55 forwardly and rearwardly with it.

More specifically, the means 17 which effects reciprocal movement of the shaft 55 includes a generally cylindrical shell 99 (FIGS. 3 and 4) supported with its longitudinal axis horizontally disposed and provided with a pin or trunion 101 projecting from its outer surface at the top and bottom to permit pivotal movement of the shell about a vertical axis. The shell 99 supports a pair of machined inserts 103 which include opposing contoured complementary camming surfaces 105 spaced from one another along the longitudinal axis of the shell to define the channel 95. The channel 95 extends around the axis of the shaft 55 and is coaxial therewith.

The cam follower 97 is affixed to the shaft 55 and includes a bracket 107 having a roller 109 secured at its outer end and provided with a generally spherical outer peripheral surface which enables the follower to track properly regardless of the orientation of the cam. As the shaft 55 rotates, the cam follower 97, being rigidly secured to the shaft, rotates therewith. However, the follower is confined to the cam channel 95. Accordingly, as the cam track displaces the cam follower 97 in the direction of the axis of the rotating shaft 55, the shaft is also displaced axially. This imparts a horizontal component of motion to the movement of the cutting wire 14, in addition to its rotary movement.

It will be appreciated that for each complete rotation of the shaft 55, the crank 51 also makes a complete rotation and causes the cutting wire 14 to make one complete cutting movement downwardly into and transversely across the cheese slab 12, then upwardly and transversely in the opposite direction. In like manner, for each complete rotation of the shaft 55, the cam follower makes one complete trip along the cam track or channel 95, moving the shaft 55 axially in one direction and then back. The crank 51 and the cam track 95 are so oriented that the shaft will move forwardly in the direction of the movement of the slab both as the cut is being made and as the wire is withdrawn from the slab, and then will move rearwardly in a direction opposite to the direction of movement of the slab as the wire is moved to a position further above the slab and transversely in the opposite direction.

When it is desired to vary the size of the segments cut, the speed of the conveyor 11 is varied relative to the period of the cutting cycle. It is therefore desirable to be able to vary the speed at which the shafts 55 and 57 reciprocate or, more specifically, to vary the speed at which the shafts move forwardly. Accordingly, provision is made for pivoting the cams 93 about the trunions 101 to vary the angle of pitch of the cam track 95 and lengthening or shortening that portion of the cam channel 95 which effects reciprocation of the shafts 55 and 57 while the wire 14 is in the slab without, however, changing the overall length of the cycle of reciprocation. An adjusting mechanism 108 is therefore provided for each cam 93 (FIGS. 2 and 3) and includes a pair of vertically spaced blocks 111, only the upper one of which is visible in the drawings, which are welded to and extend from the rearward surface of the shell 99. Each of the blocks 111 is provided with a central vertically disposed opening and a pin 113 extends between the blocks and is journalled at its opposite ends in the openings for pivotal movement about a vertical axis. A threaded horizontally disposed opening is provided in the pin 113 intermediate the blocks 111 and a threaded shaft 115 is threaded into this opening.

The shaft 115 is axially coupled to a rotatably mounted generally aligned shaft 117 by means of a universal joint 119 and is drivingly coupled to a horizontally disposed adjusting shaft 121 by suitable means such as a worm gear arrangement. The adjusting shaft extends above and transversely to the shaft 117 through the adjacent side walls of the housings 65 and 67, through the housing 67, and terminates in a calibrated adjusting knob 123 located adjacent the outer wall of the housing 67. Interiorly of the housing 67 the shaft 121 is drivingly coupled to an adjusting mechanism 125 essentially identical to the mechanism 108 just described.

Accordingly, when it is desired to change the size of the cheese segments being cut, the speed of the conveyor 11 is changed an appropriate amount relative to the period of the cutting cycle. The shaft 121, which has been previously calibrated, is then rotated to rotate the shafts 115 and 117 of the adjusting mechanism 109 and the corresponding shafts of the mechanism 125. The shaft 115 is therefore threaded further into or withdrawn from the pin 113 and its counterpart, which serves to pivot each cam 93 about a vertical axis, as previously described.

As has already been pointed out, the rotation of the shafts 55 and 57 and the cranks 51 and 53 imparts to the cutting wire 14 a motion in which the wire not only moves downwardly into the slab 12 but also moves across the slab to provide a slicing action. It should also be appreciated that this rotary movement is advantageous in that it does not require an abrupt change in direction of any moving parts such as might be necessary in some forms of cutting apparatus to return the cutting tool to its starting position and, therefore, does not present the inertia problems which might impose a limit on the speed at which the machine can be operated. The adjustability feature is also advantageous in assuring a vertical cut and in permitting corrections to be made if necessary while the machine is operating.

The drive mechanism for the apparatus is shown in FIG. 5 and comprises generally a motor 127 which is preferably capable of being operated at a selectively variable speed in order that the overall output rate of the apparatus may be adjusted. The motor is coupled through a conventional gear reduction 129 to the drive shaft 81 of the housing 65 and the shaft 81 is in turn connected directly to the shaft 55 and indirectly to the shaft 57 by means of the shaft 85. A combination clutch-brake coupling 131 is mounted between the motor 127 and the drive shaft for reasons which are subsequently explained. The motor 127 is also coupled through the gear reduction 129 to a variable speed coupling unit 133 by a shaft 135. The unit 133 is coupled to a gear reduction 137 by a shaft 139. A shaft 141, providing an output from the gear reduction 137, rotates a sprocket 143 for a drive chain 145 which drives the conveyor 11 at selectively variable speeds.

When it is desired to vary the length of the segments cut by the apparatus, the speed of the conveyor 11 is changed relative to the period of the cycles of the cutting wire 14. A faster conveyor speed results in longer segments for a given cutter cycle period. Conversely, a relatively slower conveyor speed results in shorter segment length for the same cutter cycle period. Where the overall output rate is to be varied, the speed of the motor 127 is adjusted so that, although the speed of both the conveyor 11 and the actuating means 16 increase or decrease, their relative speeds remain unchanged.

It will be appreciated that if the movement of the cutting wire were continuous and the slabs 12 fed randomly through the cutting station, the first and last segments cut would very likely not be of the desired size. The first cut might well measure only a fraction of the length desired and the size last cut would vary depending upon what the first cut measured. It is highly conceivable, therefore, that an entire segment otherwise available could be lost to waste for each slab cut.

In order to avoid this loss, the operation of the cutter is coordinated with the position of the trailing edge of the slab so that the initial cut is made a distance from the leading edge of the slab such that the remainder of the slab will divide equally into segments of predetermined length. To accomplish this, the cyclical movement of the cutting wire 14 is interrupted between slabs continuously fed by the conveyor 11 and is started, for each slab, at precisely the right time to make the initial segment cut of proper size.

The synchronization of the motion of the cutting wire 14 with the position of the trailing edge of each cheese slab to be cut into segments is accomplished by the sensing means 18 which comprises pivotally mounted arms 147 and 149 which engage the lugs 35 of the chain conveyor 21 and are moved thereby. The arm 147 controls a switch 151 which controls the operation of the combined brake-clutch device 131 to halt the cutter wire 14. The arm 149 controls a switch 153 which controls the operation of the brake-clutch device 131 to reinstate or initiated movement of the cutter wire 14. The brake-clutch unit 131 is preferably of a very fast acting design.

When a lug 35 of the chain conveyor 21 pushing a slab 12 of cheese on the conveyor 11 engages the sensor arm 149 so as to cause the arm to pivot, the switch 153 and its associated circuitry operate to release the brake 131 and engage the clutch of the brake-clutch unit. The cheese slabs are not of uniform predetermined length so that, although the trailing edge of the slab is referenced to the position of the lug pushing it, the leading edge normally is not. The positioning of the arm 149 is such that the first cut is made in the slab at such a distance from the trailing edge that the remainder of the slab, i.e., that portion between the first cut and the trailing edge can be equally divided into segments of the desired size with no waste. In this manner, the initial segment cut is of such a size as to reduce the rejection losses from the slab as a whole.

The arm 147 is positioned so that when the lug pushing a slab 12 passes over it, the clutch 131 is disengaged so as to halt the movement of the cutting wire until a succeeding slab enters the cutting station. The clutch is adjusted so as to halt the actuating means with the cutting wire 14 in the same position each time. Accordingly, the cutting wire 14 is referenced to a starting position so that an accurate cut may be made in the next slab when the actuating means are re-started.

It may therefore be seen that the invention provides improved cutting apparatus for cutting material into segments. The initial cut made in each slab is so located as to reduce waste or scrap material, allowing each succeeding segment cut to be of exact size with no scrap at the trailing edge. Moreover, the size of the segments cut is selectively variable while at the same time highly accurate and perpendicular cuts may be obtained for all segment sizes.

While one specific structural embodiment of the invention has been shown and described, it should be apparent that various modifications may be made therein without departing from the scope of the invention.

Various of the features of the invention are set forth in the following claims.

What is claimed is:

1. An apparatus for cutting a segment from a slab of material such as cheese comprising an elongated cutting instrument, means supporting said instrument adjacent each of its ends, means for moving said cutting instrument from a position above the slab downwardly and in the direction of its length so as to slice the slab while maintaining the longitudinal axis of said cutting instrument generally horizontal, each of the opposite ends of said cutting instrument being connected to the arm of one of a pair of cranks and each crank being rotated by one of a pair of rotatably driven shafts disposed in parallel relation to the path of movement of the slab at the cutting station, and means for causing said shafts to reciprocate as they rotate so as to cause said cutting instrument to travel in the direction of movement of the slab at the approximate speed of movement of the slab as the cut is made.

2. An apparatus in accordance with claim 1, wherein said means for causing said shafts to reciprocate includes means defining a cam track encircling each of said shafts and a cam follower secured to each of said shafts and rotatable therewith.

3. An apparatus in accordance with claim 1, wherein means are provided for selectively varying the speed of reciprocation of said shafts as the cut is made so that the speed of travel of the wire in the direction of movement of the slab may be selectively varied.

4. An apparatus in accordance with claim 2, wherein means are provided for selectively shifting the position of each of said cam track defining means to selectively vary the reciprocation of each of said shafts.

5. An apparatus in accordance with claim 4, wherein said shifting means include means mounting said cam track defining means for pivotal movement about a fixed axis and means for effecting controlled pivotal movement of said cam track defining means about said axis.

6. An apparatus for cutting a segment from a slab of material comprising an elongated cutting instrument, means supporting said instrument adjacent one of its ends, means for moving said cutting instrument from a position above the slab downwardly and in the direction of its length so as to slice the slab while maintaining the longitudinal axis of said cutting instrument generally horizontal, a conveyor for moving the slab continuously during cutting, said conveyor being adapted to advance slabs in spaced apart relation to the past said cutting instrument, means for sensing the approach of the trailing edge of a slab to the cutting instrument and for controlling the operation of the means moving the cutting instrument so that the first segment cut from the slab and including the leading edge thereof will be of such a length that a predetermined number of segments of given size can be cut from the remainder of the slab, and means for arresting the movement of said cutting instrument after the last segment is cut from one slab and before the first segment is cut from the following slab.

7. An apparatus in accordance with claim 6, wherein said arresting means are effective to maintain said cutting instrument in a predetermined position when it is not in motion.

8. An apparatus for cutting a segment from a moving slab of material comprising an elongated cutting instrument, means supporting said instrument adjacent one of its ends, means for moving said cutting instrument from a position above the slab downwardly and in a first direction of its length so as to slice the slab while maintaining the longitudinal axis of said cutting instrument generally horizontal, and a conveyor for moving the slab in a direction transverse to said first direction continuously during cutting, said cutting instrument being simultaneously moved in the direction of movement of the slab at the approximate speed of movement of the slab as the cut is made.

9. An apparatus in accordance with claim 8, wherein means are provided for varying the speed of said conveyor to vary the length of the segments cut.

10. An apparatus for cutting a segment from a slab of material comprising an elongated cutting instrument, means supporting said instrument adjacent one of its ends, means for moving said cutting instrument from a position above the slab downwardly and in the direction of its length so as to slice the slab while maintaining the longitudinal axis of said cutting instrument generally horizontal, a conveyor for moving the slab continuously during cutting, said conveyor having means to advance slabs in spaced apart relation to and past said cutting instrument, and means for sensing the approach of the trailing edge of a slab to the cutting instrument and for controlling the operation of the means moving the cutting instrument so that the first segment cut from the slab and including the leading edge thereof will be of such a length that a predetermined number of segments of given size can be cut from the remainder of the slab.

References Cited

UNITED STATES PATENTS

| 30,529 | 10/1860 | Cowdery | 146—137 |
|---|---|---|---|
| 586,192 | 7/1897 | Ludlam et al. | 25—111 |
| 1,469,744 | 10/1923 | Wessale | 146—133 X |
| 1,913,153 | 6/1933 | De Salardi | 83—328 X |
| 3,055,251 | 9/1962 | Krikorian | 31—22 X |
| 3,064,512 | 11/1962 | Zurlo | 83—646 X |
| 3,333,495 | 8/1967 | Stuchbery et al. | 83—135 |

ALDRICH F. MEDBERY, Primary Examiner

U.S. Cl. X.R.

25—111; 31—20; 83—327, 646; 146—133